(No Model.)

B. G. LAMME.
DIRECT CURRENT ELECTRICAL MACHINE.

No. 599,941. Patented Mar. 1, 1898.

WITNESSES:
Ethan D. Dodds
Hubert C. Tener

INVENTOR
Benjamin G. Lamme
BY
Wesley G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

DIRECT-CURRENT ELECTRICAL MACHINE.

SPECIFICATION forming part of Letters Patent No. 599,941, dated March 1, 1898.

Original application filed May 8, 1896, Serial No. 590,665. Divided and this application filed July 8, 1897. Serial No. 643,804. (No model.)

*To all whom it may concern:*

Be it known that I, BENJAMIN G. LAMME, a citizen of the United States, residing at Pittsburg, in the county of Allegheny and State of Pennsylvania, have invented a new and useful Improvement in Direct-Current Electrical Machines, (Case No. 746,) of which the following is a specification, this application being a division of my application filed May 8, 1896, Serial No. 590,665.

My invention relates to direct-current electrical generators and motors; and it has for its object to provide means whereby the commutation of the current from or to such machines may be made.

In the original application, of which this is a division, I have illustrated and described two forms of construction for varying the relation between the armature-coils and the magnetic field, so as to effect a satisfactory commutation of the currents without necessitating a careful and delicate adjustment of the commutator-brushes. Substantially the result which is secured by the means described and claimed in such original application may be secured by the means herein shown and described.

Figure 1:
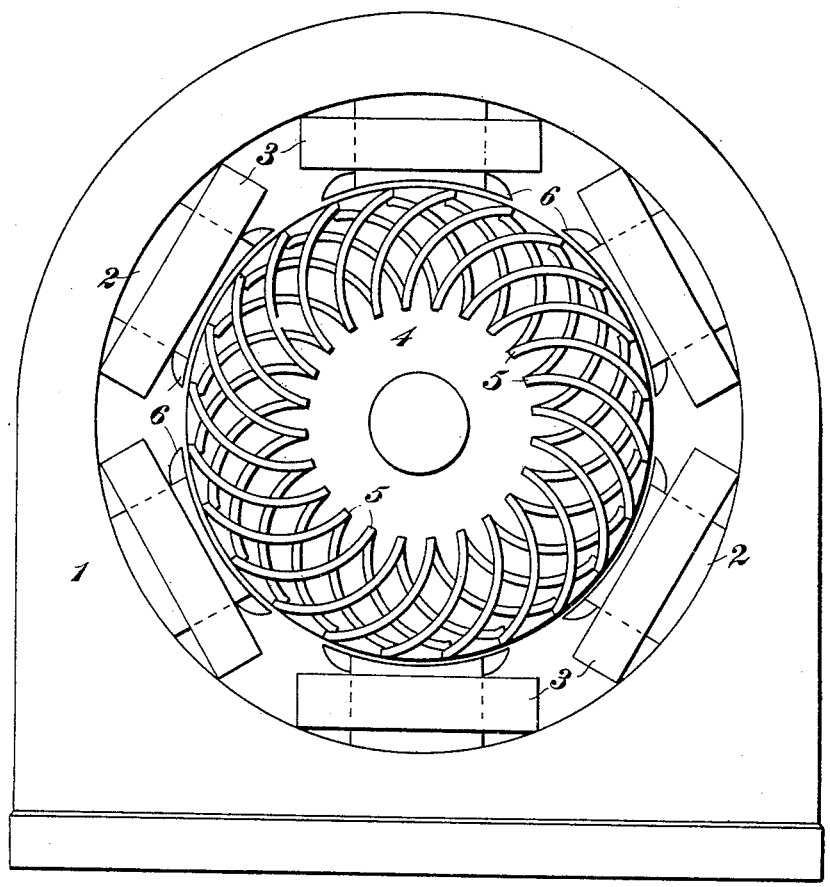
Figure 2:
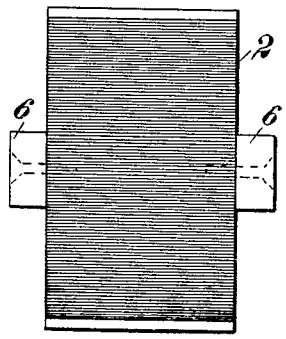

In the accompanying drawings, Figure 1 is a side elevation, partially diagrammatic, of a machine constructed in accordance with my present invention; and Fig. 2 is a face view of one of the field-magnet pole-pieces of such machine.

The details of construction are as follows: 1 is the field-magnet frame, and 2 the inwardly-projecting laminated pole-pieces of usual construction.

3 are the field-magnet coils mounted on the pole-pieces 2, and 4 is the armature, the coils 5 of which constitute what is known as a "pitch-winding"—that is to say, the distance between the sides of each coil is equal to the distance between the corresponding edges of adjacent field-magnet pole-pieces. Each of the pole-pieces 2 is provided with pole shoes or projections 6, these pole-shoes being bolted or otherwise fastened to the sides of the pole-pieces at their inner ends and preferably so that their faces shall constitute continuations of the pole-face proper. These pole-shoes are, however, materially narrower than the pole-piece proper, as is clearly shown in Fig. 2.

In order to secure satisfactory commutation of currents of considerable volume, it is necessary to so adjust the commutator-brushes that there shall be a considerable counter electromotive force exerted in the coils, which are short-circuited at the brushes. This counter electromotive force is secured in the usual form of machine by so adjusting the brushes that both sides of each of the short-circuited coils are located in the fringe of the magnetic field. In machines of the usual construction this fringe is necessarily very narrow, and consequently an adjustment of the brushes beyond the proper position in one direction or the other will bring the short-circuited coils either into the position of no-field strength or full-field strength. In the former case there will be no counter electromotive force in such coils and in the latter it will be greatly in excess of that desired, and the commutation will not be satisfactory.

In the construction illustrated and described in the original application, of which this is a division, the coils short-circuited at the brushes may be so located that one side is within the magnetic field and the other side outside of such field, and the position is also such that the brushes may be adjusted a considerable distance without materially varying this condition.

According to my present invention, as will be readily seen, both sides of each of the short-circuited coils are necessarily located in the magnetic field, but as the pole-shoes are very much narrower than the pole-pieces proper the strength of the field through and adjacent to these pole-pieces is very much less than the full-field strength, the result being that the width of the fringe of the magnetic field is greatly increased. It is possible, therefore, to locate both sides of the short-circuited coils in this comparatively weak field and to vary the position of the brushes to a considerable degree without getting the condition of either full-field strength or of no-field strength.

While I have illustrated and described a specific form of apparatus, I desire it to be understood that the invention is not limited to such specific details.

I claim as my invention—

1. In a direct-current generator or motor, a field-magnet having inwardly-projecting pole-pieces provided with relatively narrow magnetic pole-shoes which project laterally from the pole-faces and serve to increase the width of the fringe of the magnetic field.

2. In a direct-current generator or motor, a field-magnet having pole-pieces provided with magnetic shoes of less thickness than the pole-pieces in the direction of the armature-axis.

In testimony whereof I have hereunto subscribed my name this 7th day of July, A. D. 1897.

BENJ. G. LAMME.

Witnesses:
H. C. TENER,
ETHAN I. DODDS.